United States Patent [19]

Tamura et al.

[11] Patent Number: 4,644,798

[45] Date of Patent: Feb. 24, 1987

[54] CAPACITIVE TYPE CONVERTER DEVICE

[75] Inventors: Hisashi Tamura; Terutaka Hirata; Tetsu Odohira; Tadahiro Ogawa, all of Tokyo, Japan

[73] Assignee: Yokogawa Hokushin Electric Corporation, Tokyo, Japan

[21] Appl. No.: 770,664

[22] Filed: Aug. 28, 1985

[30] Foreign Application Priority Data

Sep. 6, 1984 [JP] Japan ................................ 59-187093

[51] Int. Cl.$^4$ .......................... G01L 7/08; G01L 9/12; G01L 19/04; C08C 19/10
[52] U.S. Cl. ...................................... 73/708; 73/718; 73/724; 331/65; 361/283
[58] Field of Search .......................... 73/708, 718, 724; 331/65; 361/283

[56] References Cited

U.S. PATENT DOCUMENTS

| | | | |
|---|---|---|---|
| 4,357,834 | 11/1982 | Kimura | 73/724 |
| 4,391,146 | 7/1983 | Grindheim | 73/718 |
| 4,586,108 | 4/1986 | Frick | 361/283 |

Primary Examiner—Donald O. Woodiel
Attorney, Agent, or Firm—Moonray Kojima

[57] ABSTRACT

A capacitive type converter device, such as used for measuring pressure, comprising first and second rectifying circuits, each including an operational amplifier with a non-inverting input terminal connected to a reference point, to which a variable condenser is connected, the variable condenser having a capacitance which varies in response to a force being measured, such as pressure, and to which a reference condenser is connected, the reference condenser having a capacitance which is fixed independent of the force being measured. The device further comprises an oscillator, whose oscillation output is applied to the variable and reference condensers, and which is controlled by a control means in response to output of the first rectifying circuit, or in response to the output of the second rectifying circuit together with the output of the first rectifying circuit, whereby an output responsive to the capacitance of the variable condenser is obtained from the output of the second rectifying circuit, or an output relating to the difference between the capacitances of the condensers is obtained from the outputs of the first and second rectifying circuits. The device eliminates adverse influences of stray capacitances, non-linearity, offset signals, and parallel capacitances and forward voltages.

10 Claims, 16 Drawing Figures

CAPACITIVE TYPE CONVERTER DEVICE

BACKGROUND OF THE INVENTION

1. Field of Invention

This invention relates to a capacitive type converter device using a detection unit comprising a variable condenser having a capacitance between electrodes which varies depending on the distance between the electrodes, and a reference condenser having a fixed capacitance which is independent of the varying capacitance. The distance between the electrodes of the variable condenser may be varied by such factors, as pressure, pressure difference, which are to be measured.

2. Description of the Prior Art

FIG. 1 depicts an example of a conventional converting device of the capacitive type, wherein the detection unit 10 comprises a variable condenser 11 having capacitance C1 which varies in response to a value to be measured (such as pressure) and a reference condenser 12 having a capacitance C2 which is fixed. By means of an oscillation output of an oscillator 20, alternating current i1 and i2, responsive respectively to these capacitances C1,C2, are caused to flow through these condensers.

Alternating current i1 is rectified and smoothed by a detecting circuit 31 comprising rectifying diodes D1 and D2, smoothing condenser Cf1, and resistor R1, which generates across resistor R1 a DC voltage E1 corresponding to capacitance C1, which is represented by the following equation:

$$E1 = f \cdot eB \cdot R1 \cdot C1 \qquad 1$$

wherein f is the oscillation frequency of oscillator 20, and eB is the amplitude of oscillation output of oscillator 20.

Alternating current i2 is smoothed by a detecting circuit 32 comprising rectifying diodes D3 and D4, smoothing condenser Cf2, and resistor R2, which generates across resistor R2, a DC voltage E2 corresponding to capacitance C2, which is represented by the following equation:

$$E2 = f \cdot eB \cdot R2 \cdot C2 \qquad 2$$

By controlling the oscillation output of oscillator 20 by means of a control circuit 40, using a differential amplifier A, so that the DC voltage E1 becomes equal to a reference voltage Es, influence due to the amplitude eB of the oscillation output is eliminated and DC voltage E2 generated across resistor R2 satisfies the relation represented by the following equation:

$$E2 = \{(R2 \cdot C2 \cdot Es)/(R1 \cdot C1)\} \qquad 3$$

Detection unit 10 has a structure or configuration such as depicted in FIG. 2, wherein arranged opposite to an insulating member 13, such as glass, is a silicon substrate 14 which is formed partially with a diaphragm section 14a. On silicon substrate 14 there is provided a common electrode 15. A portion of the common electrode on diaphragm 14a functions as a movable electrode 15a and the other portion functions as a fixed electrode 15b. On insulating member 13 there are provided different fixed electrodes 16 and 17 concentrically and opposite to common electrode 15. The outside of silicon substrate 14 is maintained, for example, at atmospheric or ambient pressure.

Accordingly, in response to a pressure P (see arrow in FIG. 2) to be measured, for example, applied through an opening 13a of insulating member 13, diaphragm section 14a is deformed or displaced. In response to such displacement, capacitance C1 of variable condenser 11 existing between the movable electrode 15a and fixed electrode 16 is caused to be varied. On the other hand, capacitance C2 of reference condenser 12 existing between fixed electrode 15b and fixed electrode 17 is maintained unchanged and independent of the displacement of diaphragm section 14a.

Capacitance C1 of variable condenser 11 relative to the extent of displacement X of movable electrode 15a is given by the following equation:

$$C1 = C0 \cdot \{d/(d+X)\} \qquad 4$$

wherein C0 denotes the initial capacitance at $X=0$, and d denotes the reference distance between movable electrode 15a and fixed electrode 16 (the distance at $X=0$).

If capacitance C2 of reference condenser 12 is selected to be equal to initial capacitance C0, DC voltage E2 becomes $$E2 = (R1/R2) \cdot \{1 + (X/d)\} \cdot Es \qquad 5$$

Thus, DC voltage E2 which is proportional to the distance between the electrodes is obtained at an output terminal Eout.

However, the prior art device has certain disadvantages. For example, the variable condenser 11 includes a stray capacitance Cs1, existing between fixed electrode 16 and a reference point, a stray capacitance Cs2, existing between movable electrode 15a and the reference point, and a stray capacitance Cs3, existing parallelly between movable electrode 15a and fixed electrode 16. Although stray capacitance Cs2 presents no special problem if the output impedance of oscillator 20 is low, the other stray capacitances Cs1 and Cs3 tend to impair the linearity of measurement.

As another example of a disadvantage with the prior devices, in case capacitance C1 of variable condenser 11 is very small, for example, of the order of 10 pF, capacitance C1 is influenced by a parallel capacitance CD, of the order of 2 pF of rectifying diodes D1 and D2 and by a forward voltage ED (=0.6 v) of these diodes.

A further disadvantage to the prior art is a very small displacement of variable condenser 11 cannot be converted accurately into a DC signal due to adverse influence of temperature variation of parts (other than the rectifying diodes).

SUMMARY OF THE INVENTION

Accordingly, an object of the invention is to overcome the aforementioned and other deficiencies and disadvantages of the prior art.

A further object is to eliminate adverse influence due to stray capacitances of the variable condenser, such as a stray capacitance existing between a reference point and a fixed electrode of the variable condenser.

Another object is to eliminate adverse influences due to parallel capacitance and forward voltage of rectifying diodes.

A still further object is to eliminate adverse influence due to temperature variation effect on various parts of the converting device.

DETAILED DESCRIPTION OF PREFERRED EMBODIMENTS

Figure 1:
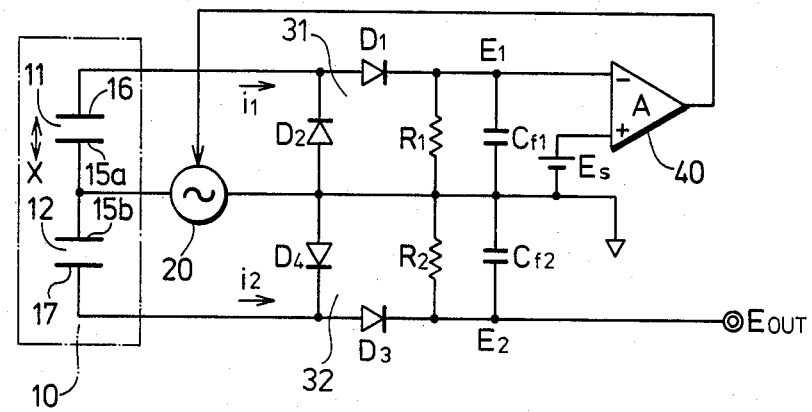
FIG. 1 is a circuit diagram depicting a conventional capacitive type converter device.
Figure 2:
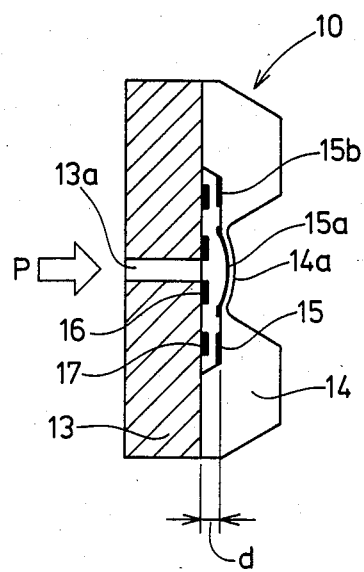
FIG. 2 depicts a cross sectional structural diagram of a detection unit used in the conventional device of FIG. 1.
Figure 3:
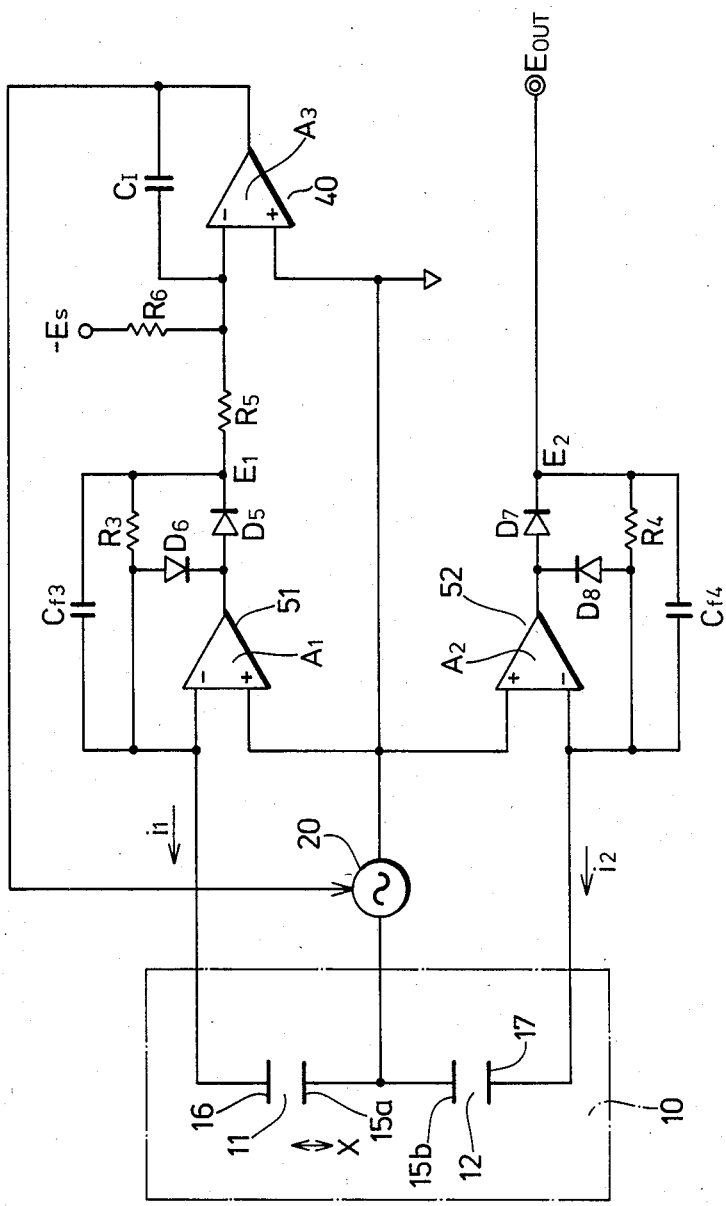
FIGS. 3, 4, 6, 7, 8, 9, 10, 12, 13, 15, and 16 are circuit diagrams of different illustrative embodiments, and modifications thereof, of the invention.

Turning now to FIG. 3 which depicts a first illustrative embodiment of the invention, the embodiment comprises a detection unit 10, a first rectifying circuit 51, a second rectifying circuit 52, and a control circuit 40. The elements which are similar to those in FIGS. 1 and 2 bear the same reference numerals, and for simplification discussion thereof is omitted hereat. The common electrode 15 (shown as connection between electrodes 15a,15b) of detection unit 10 is connected to oscillator 20.

A detecting circuit 51 forms a first rectifying circuit which includes an operational amplifier A1 and a feedback circuit, for feeding back the output of amplifier A1 to its inverting input terminal (−), comprising rectifying diodes D5 and D6, resistor R3 and smoothing condenser Cf3.

Fixed electrode 16 of variable condenser 11 is connected to inverting input terminal (−) of amplifier A1. The non-inverting input terminal (+) of amplifier A1 is connected to the reference point. The detecting circuit 51 rectifies alternating current i1 (which is produced in response to capacitance C1 of variable condenser 11) and provides DC voltage E1 at the connection point between diode D6 and resistor R3.

A detecting circuit 52 forms a second rectifying circuit which includes an operational amplifier A2 and a feedback circuit, for feeding back the output of operational amplifier A2, to its inverting input terminal (−), comprising rectifying diodes D7 and D8, resistor R4 and smoothing condenser Cf4.

Fixed electrode 17 of reference condenser 12 is connected to the inverting input terminal (−) of amplifier A2. The non-inverting input terminal (+) of amplifier A2 is connected to the reference point. Detecting circuit 52 rectifies the alternating current i2 (which is produced in response to capacitance C2 of reference condenser 12) and provides DC voltage E2 at the connection point between diode D8 and resistor R4.

Control circuit 40 is formed by an integrator comprising an operational amplifier A3 and an integrating condenser CI connected in the feedback circuit of amplifier A3. Control circuit 40 adds and integrates DC voltage E1 applied through resistor R5 and a negative reference voltage Es applied through resistor R6 to the inverting input terminal (−) of amplifier A3, and further controls oscillator 20 by means of its output via a connection therebetween.

According to the foregoing configuration, the inverting input terminal (−) of amplifiers A1 and A2, forming detecting circuits 51 and 52, are always maintained at the potential of the reference point by means of negative feedback, so that no current flows through the stray capacitance Cs1 existing between fixed electrode 16 and the reference point. Thus, adverse influence due to the stray capacitance Cs1 is eliminated.

Figure 4:
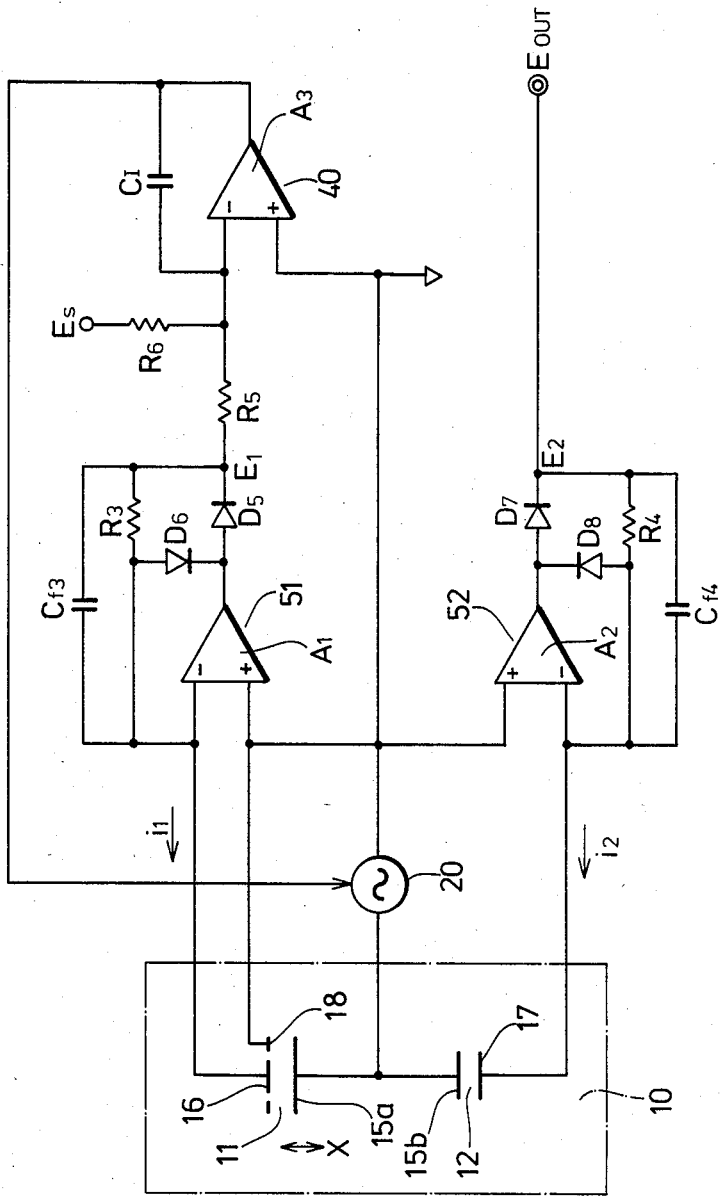
Figure 5:
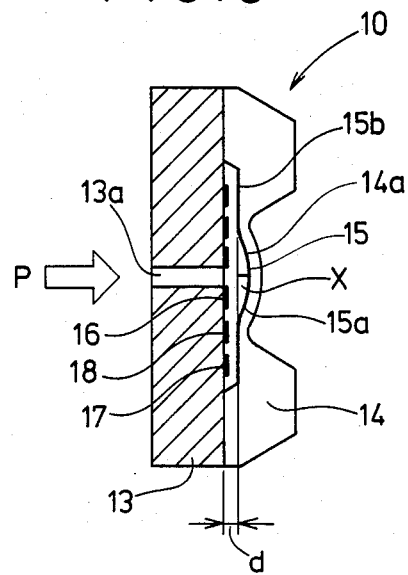
FIG. 5 depicts a cross sectional diagram of a detection unit useable in the embodiments of the invention.

FIG. 4 is a circuit diagram of a second illustrative embodiment of the invention. FIG. 5 depicts a cross sectional structural diagram of detection unit 10 as used, for example, in FIG. 4. This detection unit has a ring shaped guard electrode 18 provided on insulating member 13 and is disposed between fixed electrodes 16 and 17. Guard electrode 18 is connected to the reference point (see FIG. 4). The configuration of converting circuit of FIG. 4 is similar to that of the embodiment of FIG. 3 except for the connection of electrode 18 to the non-inverting input terminal (+) of amplifier A1, and to the reference point.

Because ring shaped guard electrode 18 of FIG. 5, is provided on the outside of fixed electrode 16 of variable condenser 11, adverse influence due to the stray capacitance Cs3 between movable electrode 15a and fixed electrode 16 of variable condenser 11, is eliminated.

Furthermore, in FIG. 4, because no current flows through the stray capacitance Cs1 between fixed electrode 16 and guard electrode 18 of variable condenser 11, alternating current i1 passing through capacitance C1 of variable condenser 11, flows into detecting circuit 51 without any change. Similarly, alternating current i2 passing through capacitance C2 of reference condenser 12 flows into detecting circuit 52 without any change.

The DC voltage E1, obtained in detecting circuit 51 by rectifying alternating current i1, is applied through resistor R5 to the integrator of control circuit 40. The integrator controls the oscillation output of oscillator 20 so that the difference between a current (E1/R5) resulting from output voltage E1 of detecting circuit 51 and a current (Es/R6) resulting from reference voltage Es, becomes zero. Thus, output E2 of detecting circuit 52 is represented by the following equation:

$$E2 = \{(R4 \cdot R5 \cdot C2)/(R3 \cdot R6 \cdot C1)\} \cdot Es \qquad 6$$

Capacitance C1 of variable condenser 11 is given by $C0 \cdot \{d/(d+X)\}$. Thus, E2 becomes $$E2 = \{(R4 \cdot R5 \cdot C2)/(R3 \cdot R6 \cdot C0)\} \cdot \{1 + (X \cdot d)\} \cdot Es \qquad 7$$

Because R3, R4, R5, R6, C0, C2, d and Es are constant, E2 corresponds exactly to the extent of displacement of movable electrode 15a of variable condenser 11.

Figure 6:
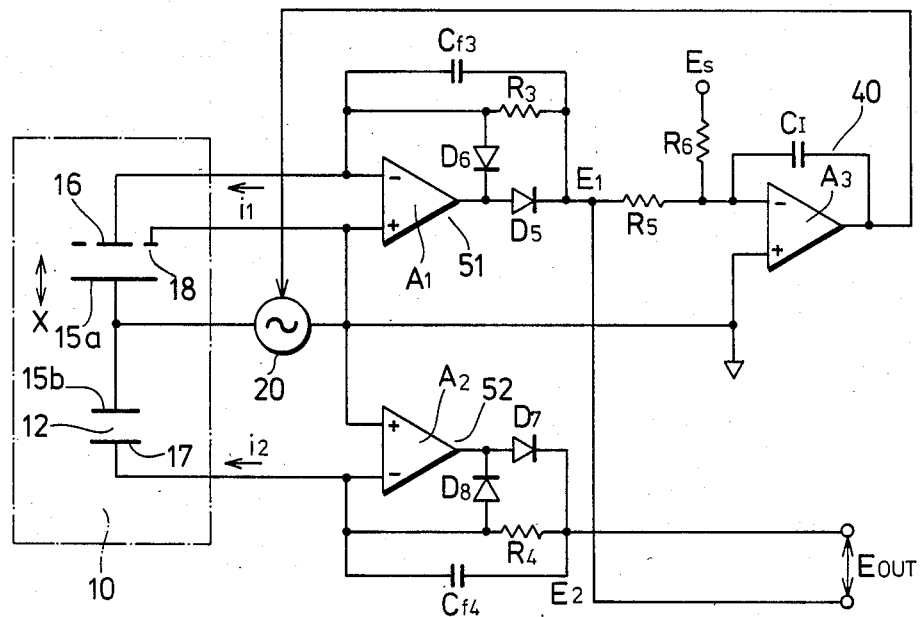

FIG. 6 embodiment is similar to the FIG. 4 embodiment except that Eout is taken between a first connection of D7, R4, Cf4 a second connection of D5, R3 and Cf3. The FIG. 6 embodiment is of a third illustrative embodiment of the invention.

The case wherein output E2 of detecting circuit 52 is taken out as the output signal is described above. If "E2−E1" is taken out as output signal Eout, as in the FIG. 6 embodiment, Eout is given by the following equation:

$$Eout = \{(R\text{-}6 \cdot Es)/R5\} \cdot \{(R4 \cdot C2 - C0 \cdot R3) \cdot d + (R4 \cdot C2 \cdot X)\}(R3 \cdot C0 \cdot d) \qquad 8$$

If the following equation:

$$(C2/C0) \cdot (R4/R3) = 1 \qquad 9$$

is satisfied, output signal Eout becomes $$Eout = \{(R6 \cdot R4 \cdot C2)/(R5 \cdot R3 \cdot C0)\} \cdot (X/d) \cdot Es \qquad 10$$

When the extent of displacement X is zero, it is possible to make Eout zero also.

Although the foregoing embodiment has common electrode 15 provided on silicon substrate 14, the common electrode may be provided on the insulating material 13, and the movable electrode, guard electrode and fixed electrode may be provided concentrically on silicon substrate 14.

Figure 7:
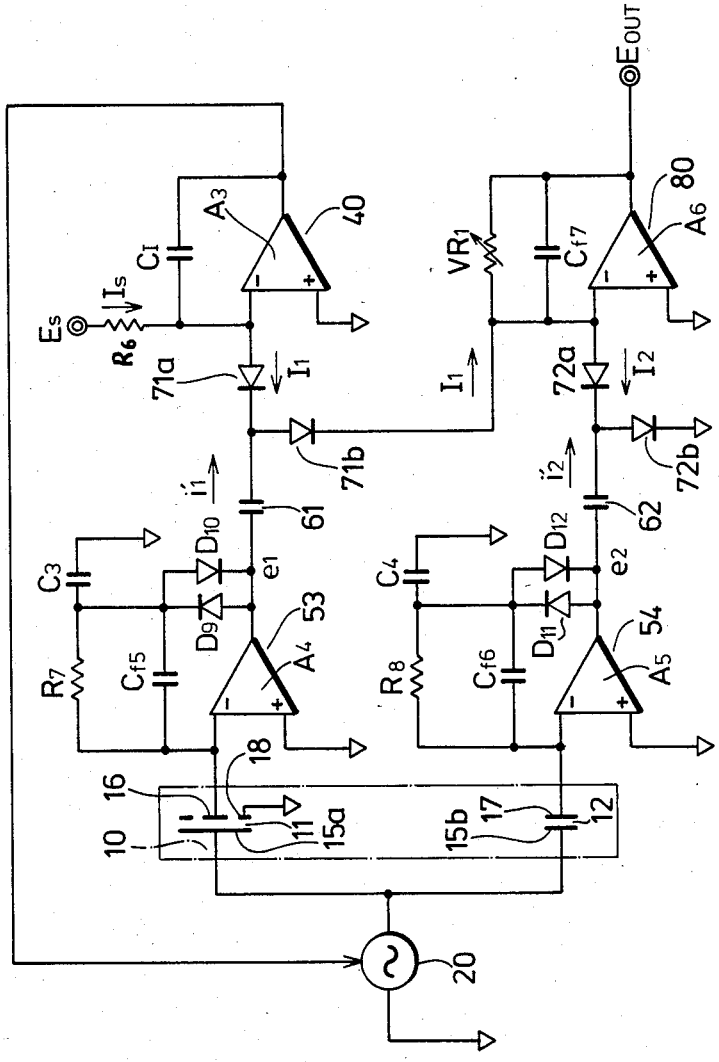

FIG. 7 is a circuit diagram of a fourth illustrative embodiment of the invention. This embodiment has a configuration wherein adverse influences due to parallel capacitance and forward voltage of the rectifying diodes are eliminated. In this FIG. 7, elements which are similar to those shown in FIGS. 3-6 bear the same reference numerals and for simplification description thereof is omitted hereat.

Connected to the variable condenser and reference condenser are charge converters 53, 54. Charge converter 53 comprises and operational amplifier A4 having an inverter input terminal (−) connected to variable condenser 11. The feed back circuit of amplifier A4 comprises in series a parallel circuit of compensation diodes D9 and D10 connected mutually parallelly with opposed polarity and another parallel circuit of a condenser Cf5 of capacitance Ca1 and a resistor R7 of resistance Ra1, with the connection point between these parallel circuits being connected through an adjusting condenser C3 to a common bus.

Charge converter 54 comprises an operational amplifier A5 having an inverting input terminal (−) connected to reference condenser 12. The feedback circuit of amplifier A5 comprises in series a parallel circuit of compensation diodes D11 and D12 connected mutually parallelly with opposed polarity and another parallel circuit of a condenser Cf6 of capacitance Ca2 and a resistor R8 of resistance Ra2, with the connection point between these parallel circuits being connected through an adjusting condenser C4 to a common bus. Condensers 61 and 62 are connected as depicted so that an AC output e1 of charge converter 53 is applied to condenser 61. An AC output e2 of charge converter 54 is applied to condenser 62. Rectifying diodes 71a and 71b rectify an alternating current i1' flowing through fixed condenser 61. Rectifying diodes 72a and 72b rectify an alternating current i2' flowing through fixed condenser 62.

In this embodiment, a first rectifying circuit is formed by charge converter 53, fixed condenser 61, rectifying diodes 71a and 71b. A second rectifying circuit is formed by charge converter 54, fixed condenser 62, rectifying diodes 72a and 72b.

Control circuit 40 adds and integrates a negative current I1 flowing through rectifying diode 71a and a reference current Is, and controls oscillator 20 by means of its output via a connection therebetween. A current/voltage converting circuit 80 comprises an operational amplifier A6, variable resistor VR1 and smoothing condenser Cf7 connected in the feedback circuit of amplifier A6. The circuit 80 adds positive direct current I1 flowing through rectifying diode 71b and a negative direct current I2 flowing through rectifying diode 71a, and converts the sum inot output voltage Eout.

If the time constants Ca1·Ra1 and Ca2·Ra2 of the feedback circuits of charge converters 53 and 54 are selected to be sufficiently large in comparison to an oscillation period 1/f of oscillator 20, amplitudes E1pp and E2pp of outputs e1 and e2 of charge converters 53 and 54 are given by the following equation:

$$E1pp = \{(C1/Ca1) \cdot eBpp\} + 2ED \qquad 11$$

$$E2pp = \{(C2/Ca2) \cdot EBpp\} + 2ED \qquad 12$$

That is because each amplitude due to the voltage drops on the compensation diodes D9 and D10 and D11 and D12 is 2 ED.

Accordingly, e1 takes a value representative of capacitance C1 of variable condenser 11 and e2 takes a value representative of capacitance C2 of reference condenser 12.

These outputs e1 and e2 are applied to fixed condensers 61 and 62, respectively, so that alternating currents i1' and i2' (produced in response to capacitances Cb1 and Cb2) flow through these condensers, respectively. Direct currents I1 and I2 obtained by rectifying these alternating currents i1' and i2' are represented by the following equations:

$$I1 = f \cdot \{Cb1 \cdot (E1pp - 2ED) - 4CD \cdot ED\} \qquad 13$$

$$I2 = f \cdot \{Cb2 \cdot (E2pp - 2ED) - 4CD \cdot ED\} \qquad 14$$

By substituting equations 11 and 12 in equations 13 and 14, respectively, the following are obtained:

$$I1 = f \cdot \{Cb1 \cdot (C1/Ca1) \cdot eBpp - 4CD \cdot ED\} \qquad 15$$

$$I2 = f \cdot \{Cb2 \cdot (C2/Ca2) \cdot eBpp - 4CD \cdot ED\} \qquad 16$$

Accordingly, if capacitances Cb1 and Cb2 of fixed condensers 61 and 62 are selected to be sufficiently large in comparison to capacitance C1 of variable condenser 11, capacitance C2 of reference condenser 12, and capacitances Ca1 and Ca2 of condensers Cf5 and Cf6, included in the feedback circuits of charge converters 53, 54, and if the following conditions:

$$Cb1 \cdot (C1/Ca1) \cdot eBpp >> 4CD \cdot ED \qquad 17$$

$$Cb2 \cdot (C2/Ca2) \cdot eBpp >> 4CD \cdot ED \qquad 18$$

are satisfied, then direct current I1 and I2 become $$I1 = f \cdot Cb1 \cdot (C1/Ca1) \cdot eBpp \qquad 19$$

$$I2 = f \cdot Cb2 \cdot (C2/Ca2) \cdot eBpp \qquad 20$$

Therefore, with this embodiment of FIG. 7, it is possible to eliminate adverse influence due to the forward voltage ED and parallel capacitance CD of the rectifying diodes.

In an actual embodiment, when the following components were used, namely, CD=2 pF; ED=0.6 V; f=100 KHz; EBpp=3 Vpp; Ca1=Ca2=11 pF and C0=11 pF, equations 17 and 18 were satisfied when each of capacitances Cb1 and Cb2 of fixed condensers 61 and 62 was selected to be of the order of 100 pF.

The integrator of control circuit 40 controls oscillation output eB of oscillator 20 so that the sum of negative direct current I1 and positive reference current Is becomes zero. Thus, the following equation holds:

$$-f \cdot \{Cb1 \cdot (C1/Ca1) \cdot eBpp\} + Is = 0 \qquad 21$$

On the other hand, output voltage Eout generated at the output end of current/voltage converting circuit 80, is given by the following equation:

$$Eout = f \cdot Ro \cdot \{Cb2 \cdot (C2/Ca2) - Cb1 \cdot (C1/Ca1)\} \cdot eBpp \qquad 22$$

wherein Ro is the resistance of variable resistor VR1. By substituting equation 21 in equations 22 and making Ca1=Ca2=Ca, and Cb1=Cb2=Cb, the output voltage becomes $$Eout = \{(C2-C1)/C1\} \cdot Ro \cdot Is \qquad 23$$

Then, because $C1 = C0 \cdot \{d/(d+X)\}$ and $C2 = C0$, eOUt is given by $$Eout = (X/d) \cdot Ro \cdot Is \qquad 24$$

This means that Eout is proportional to the extent of displacement X of movable electrode 15a of variable condenser 11.

In the above, the circuit constants of FIG. 7 were selected so as to satisfy the conditions represented by equations 17 and 18 thereby to eliminate adverse influences due to forward voltage ED and parallel capacitance CD of the rectifying diodes 71a, 71b, 72a, and 72b.

Figure 8:
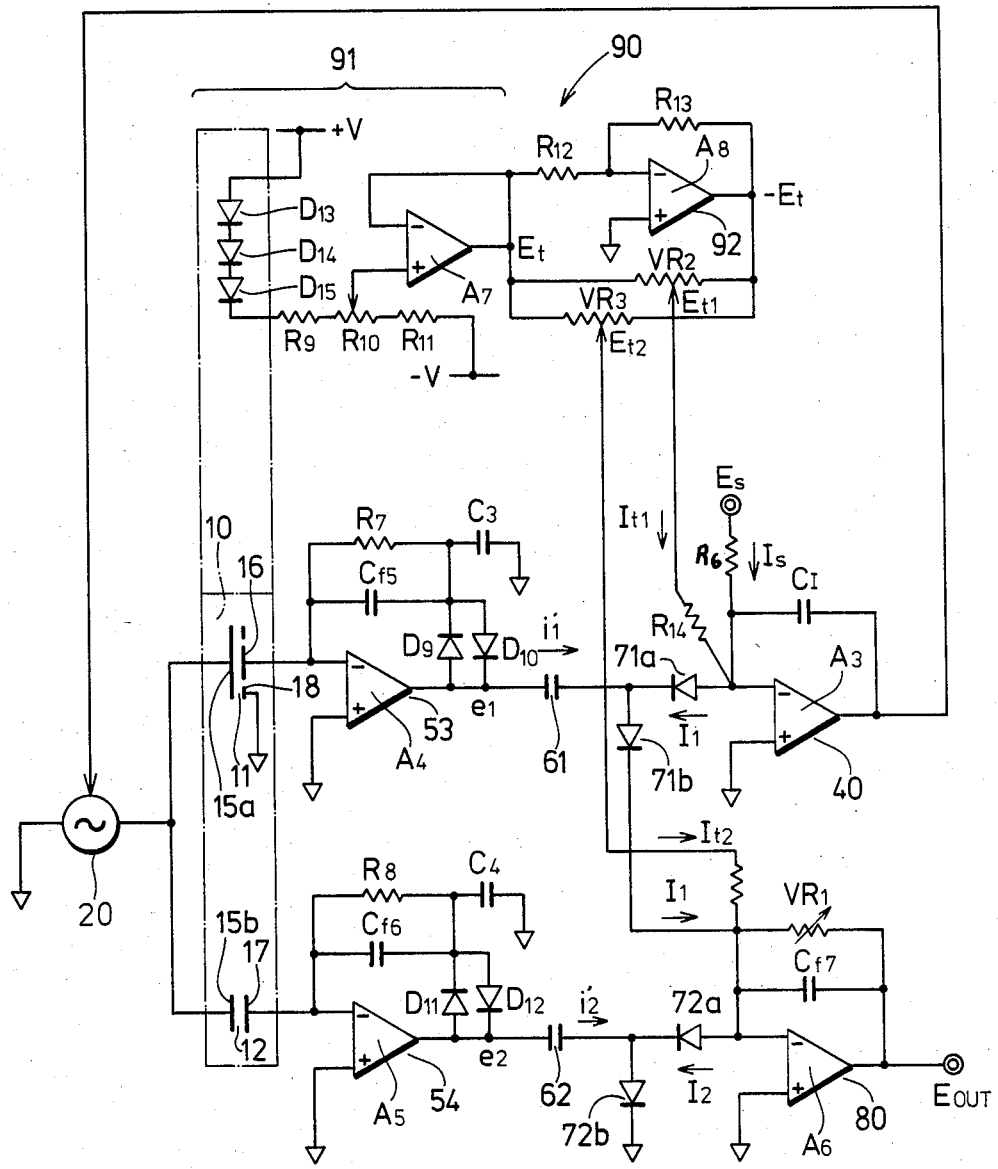

FIG. 8 is a circuit diagram showing a fifth illustrative embodiment of the invention, which is used to effectively compensate for temperature errors of parts of the device, other than the mentioned diodes. In FIG. 8 elements which are similar to those shown in FIGS. 4–7 bear the same reference numbers and for simplicity will not be further described hereat.

The FIG. 8 embodiment has a temperature compensation circuit 90 comprising a temperature detecting circuit 91 comprising a series circuit connected between a stabilized positive source +V and a negative source −V, comprising ambient temperature sensor diodes D13, D14 and D15, and resistors R9, R10 and R11, and a buffer amplifier A7 having an input (+) connected to a brush of resistor R10. An inverting circuit 92 comprising an operational amplifier A8 and two resistors R12 and R13 of the same resistance value, is connected to the output of temperature detection circuit 91 through resistor R12 to inverting input terminal (−) of amplifier A8. A slide resistor VR2 has one end connected to the output end of temperature detection circuit 91 and the other end connected to the output end of amplifier A8 and a brush connected through a resistor R14 to the inverting input terminal (−) of amplifier A3 of control circuit 40.

In temperature detection circuit 91, with respect to the ambient temperature conditions, the upper limit temperature tH is set to, for example, 70° C., the lower limit temperature tL is set to, for example, −20° C., and the reference temperature t0 is set to, for example, between these two limits at 25° C. The brush of resistor R10 is adjusted so that a voltage Et generated at the output end of buffer amplifier A5 at the reference temperature t0 becomes identical to the potential of the reference point, that is, zero. By the thus adjusted temperature detection circuit 91, the voltage Et which is approximately proportional to the difference (t−t0) between the ambient temperature t and reference temperature t0 is generated at the output end of buffer amplifier A7.

This voltage Et is positive in the range of t>t0 and negative in the range of t<t0, because the temperature coefficient of the forward voltage drop of diodes D12, D14 and D15 is negative. That is, Et takes the positive maximum value at the upper limit temperature tH, decreases with a lowering of t, takes zero at t=t0, changes to a negative value if t decreases further, and takes the maximum value of negative sign at the lower limit tL.

Although the embodiment uses one or more diodes as the temperative sensor, the invention is not limited to diodes and various other elements can be used instead, such as, for example, transistors, thermistors, or metal wires having a comparatively large coefficient of resistance, etc.

The output Et of temperature detection circuit 91 is applied to one end of slide resistor VR2 directly and through the inverting circuit 92 to the other end of the slide resistor VR2. Accordingly, on the brush of slide resistor VR2, a temperature compensation signal voltage Et1 is generated, responsive to the difference (t−t0) between the ambient temperature t and reference temperature t0. The magnitude and polarity of the above voltage can be easily adjusted and changed through adjustment of the position of the brush of slide resistor VR2. The value of Et1 at the reference temperature t0 is zero irrespective of the position of the brush of slide resistor VR2.

On the basis of the temperature compensation signal voltage Et1, a temperature compensation current It1 flows through resistor R14, whereby operational amplifier A3 of control circuit 40 controls the oscillation output eB of oscillator 20 so as to make zero the sum of negative direct current I1, including a temperature error component, reference current Is and temperature compensation current It1. As a result, the following relation holds:

$$-f \cdot \{Cb1 \cdot (C1/Ca1) \cdot eBpp\} + Is + It1 = 0 \qquad 25$$

Output voltage Eout generated at the output end of current/voltage converting circuit 80 is given by equation 22. By substituting equation 25 in equation 22, and making Ca1=Ca2=Ca and Cb1=Cb2=Cb, output voltage Eout is given by the following equation:

$$Eout = \{(C2-C1)/C1\} \cdot Ro \cdot (Is+It1) \qquad 26$$

Thus, a span temperature error can be compensated for this embodiment through adjustment of Et1.

In case the zero point of the output voltage Eout fluctuates with change of ambient temperature due to variations in the properties of rectifying diodes 71a, 71b, 72a and 72b, even when the value to be measured is zero (C1=C2=C0), a temperature error at the zero point can be compensated for by using, a supplemental second slide resistor, such as second slide resistor VR3 connected in parallel with slide resistor VR2 of temperature compensation circuit 90. This resistor VR3 will produce a second temperature compensation signal voltage Et2 and cause a temperature compensation current It2, resulting from the above voltage, to flow into the input circuit of the current/voltage converting circuit 80 via an unnumbered resistor.

In the above case, adjustment of Et2 is carried out by adjusting the position of the brush of slide resistor VR3 so that the output voltage Eout becomes equal to the output voltage Eout when C1=C2 at the reference temperature t0 and at an arbitrary temperature t.

Therefore, advantageously, this embodiment eliminates adverse influence due to temperature errors caused by various parts in the device, other than the rectifying diodes.

Figure 9:
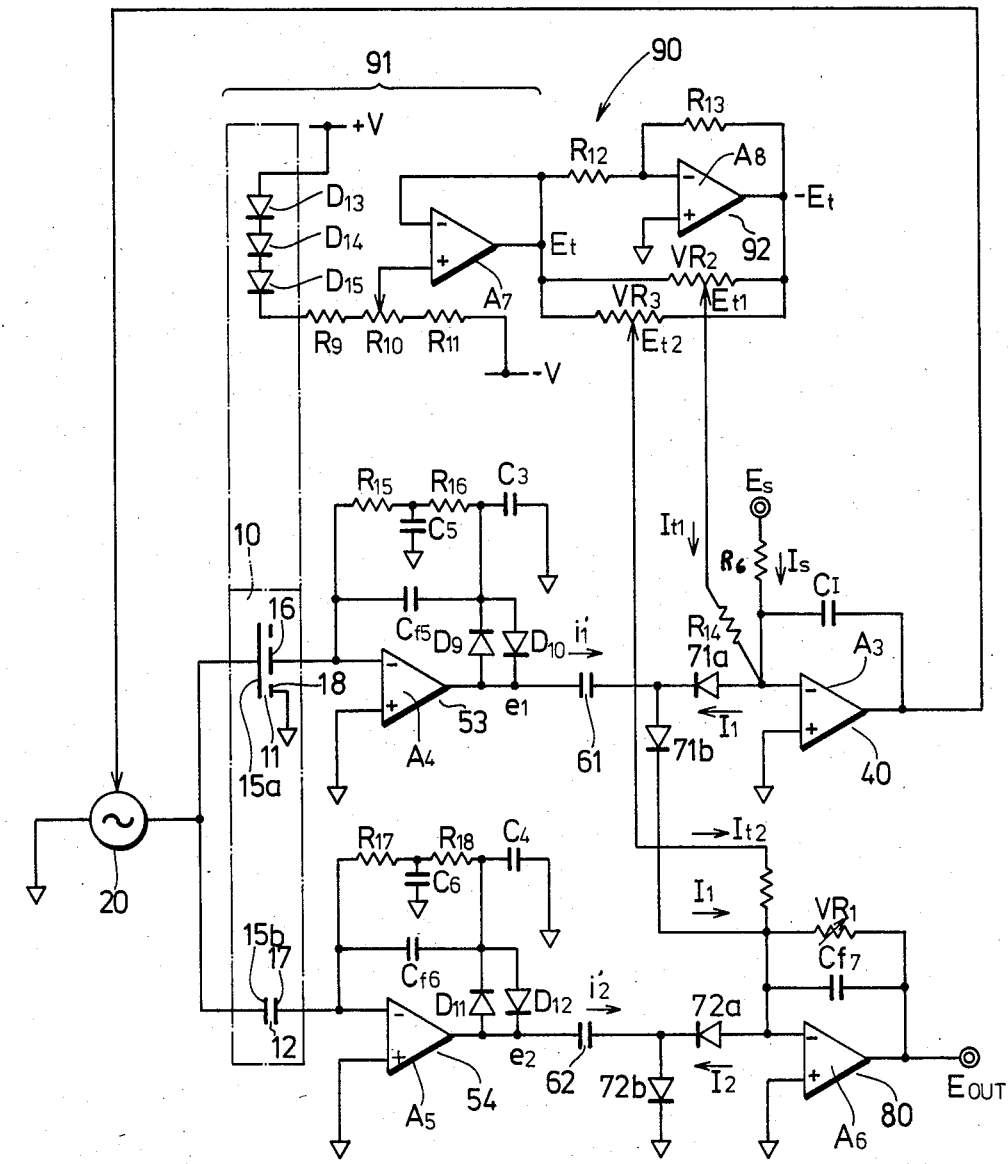

FIG. 9 depicts an embodiment wherein certain elements are substituted for other elements in the embodiments of FIGS. 7 and 8. In the FIGS. 7 and 8 embodiments, the feedback circuits of charge converters 53,54 include the parallel circuit of condenser Cf5 and resistor R7 and the parallel circuit of condenser Cf6 and resistor R8, respectively. However, as depicted in FIG. 9, it is possible to use a T-type filter, comprising resistors R15 and R16 and condenser C5, in place of the resistor R7 and a T-type filter comprising resistors R17 and R18 and condenser C6, in place of resistor R8.

Figure 10:
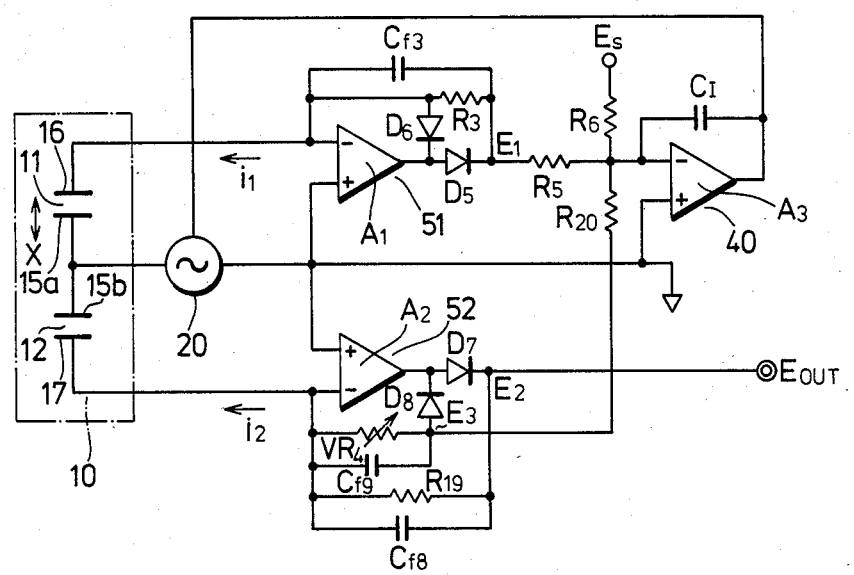

FIG. 10 is a circuit diagram of a sixth illustrative embodiment of the invention, which is designed to eliminate adverse influence due to stray capacitance Cs3 existing parallelly between movable electrode 15 and fixed electrode 16, and to correct non-linearity of the relation between the value to be measured and the extent of displacement of movable electrode 15a of variable condenser 11. In FIG. 10, elements which are similar to those shown in FIGS. 3, 4 and 6 bear the same reference numerals and for simplification are not described in detail hereat.

Detecting circuit 52 includes operational amplifier A2 and a feedback circuit for feeding the output of amplifier A2 back to the inverting input terminal (−) of the amplifier A2. The feedback circuit comprises rectifying diodes D7 and D8, resistor R19, variable resistor VR4, and smoothing condensers Cf8 and Cf9. The inverting input terminal (−) of amplifier A2 is connected to electrode 17 of reference condenser 12. The non-inverting input terminal (+) of amplifier A2 is connected to the reference point. Detecting circuit 52 detects alternating current i2 (produced in response to capacitance C2 of reference condenser 12) and provides positive DC voltage E2 at the connection point between diode D7 and resistor R19 and a negative DC voltage E3 at the connection point between diode D8 and variable resistor VR4. DC voltage E2 is produced at output Eout.

Control circuit 40 comprises an operational amplifier A3, and connected to the inverting input terminal (−) are capacitor CI, resistors R5, R6, R20, as depicted. Control circuit 40, comprising the amplifier A3, adds and integrates DC voltage E1, applied thereto through resistor R5, negative DC voltage E3 applied thereto through a resistor R20, and negative reference voltage Es applied thereto through resistor R6; and controls oscillator 20 by means of the output of amplifier A3, which is applied via the interconnection therebetween.

In FIG. 10, as the oscillation output of oscillator 20 is applied to variable condenser I1 and reference condenser 12, DC voltage E1, E2 and E3 obtained by rectification action of detecting circuits 51 and 52, are given by the following equations:

$$E1 = f \cdot eB \cdot R3 \cdot C1 \quad\quad 27$$

$$E2 = f \cdot eB \cdot R19C \quad\quad 28$$

$$E3 = -f \cdot eB \cdot VR4 \cdot C2 \quad\quad 29$$

These are similar to equations 1 and 2 hereinabove.

Because the integrator of control circuit 40 controls the oscillation output of oscillator 20 so that the sum of the current (E1/R5) resulting from DC voltage E1, the current (E3/R20) resulting from the DC voltage E3, and the current (Es/R6) resulting from the reference voltage Es, becomes zero, and thus, the following equations hold:

$$\{(f \cdot eB \cdot R3 \cdot C1)/R_t\} - \{(f \cdot eB \cdot VR4 \cdot C2)/R20\} - (Es/R6) = 0 \quad\quad 30$$

Accordingly, output voltage E2 of the detecting circuit 52 is given by the following equation:

$$E2 = (R19 \cdot R5 \cdot R20 \cdot C2 \cdot Es)/\{R6 \cdot (R3 \cdot R20 \cdot C1 - VR4 \cdot R5 \cdot C2)\} \quad\quad 31$$

Capacitance C1 of variable condenser 11 is represented by the following equation:

$$C1 = C0 \cdot \{d/(d+X)\} + Cs3 \quad\quad 32$$

wherein Cs3 denotes stray capacitance existing parallelly between movable electrode 15a and fixed electrode 16.

Accordingly, E2 becomes $$E2 = \{R19 \cdot R5 \cdot R20 \cdot C2 \cdot (d + X) \cdot Es\}/R6 \cdot \{(R3 \cdot R20 \cdot C0 + R3 \cdot R20 \cdot Cs3 - VR4 \cdot R5 \cdot C2) \cdot d + (R3 \cdot R20 \cdot Cs3 - VR4 \cdot R5 \cdot C2) \cdot X\} \quad 33$$

Thus, if the resistance value of variable resistor VR4 is selected to satisfy the following equation:

$$R3 \cdot R20 \cdot Cs3 - VR4 \cdot R5 \cdot C2 = 0 \quad\quad 34$$

the output voltage E2 becomes $$E2 = \{(R19 \cdot R5 \sim C2)/(R3 \cdot R6 \cdot C0)\} \cdot \{(1 + X/d) \cdot Es\} \quad 35$$

Figure 11:
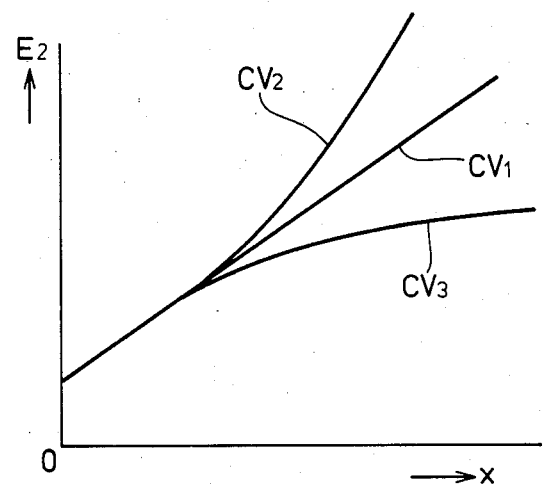
FIGS. 11 and 14 are graphs depicting the relation between output voltage and displacement as affected by various factors.

Accordingly, as depicted in FIG. 11, using the FIG. 10 embodiment, adverse influence due to stray capacitance Cs3 is eliminated, and the output voltage corresponds exactly to the extent of displacement X as represented by line CV1.

On the other hand, if the resistance value of variable resistor VR4 is adjusted to satisfy the following relation:

$$(R3 \cdot R20 \cdot Cs3)/(VR4 \cdot R5 \cdot C2) < 1$$

the rate of increase of output voltage E2 increases with increase of the extent of displacement X as shown by curve CV2 in FIG. 11.

Moreover, if the resistance value of variable resistor VR4 is adjusted to satisfy the following relation:

$$(R3 \cdot R20 \cdot Cs3)/(VR4 \cdot R5 \cdot C2) > 1$$

the rate of increase of output voltage E2 decreases with increase of the extent of displacement X, as shown by curve CV3 in FIG. 11. Thus, it is possible to make the input/output relation non-linear by suitable adjustment of the variable resistor VR4.

Accordingly, non-linearity of the relation between pressure P to be measured and the extent of the displacement X of movable electrode 15a can be effectively compensated for through adjustment of the value of the variable resistor VR4. In addition, the temperature coefficient of the non-linearity is identical to that of the reference capacitance C0 of variable condenser 11.

Because adverse influence due to stray capacitance Cs3 and the non-linearity between pressure P to be measured and the extent of displacement of the movable electrode 15a can be compensated for by adjusting the resistance value of variable resistor VR4, in practical terms, the non-linearity is most of the time compensated for through adjustment of the variable resistor VR4 so that the relation between pressure P to be measured and output voltage E2 is linear.

Advantageously, in the invention, the non-linearity may also be compensated for by adjusting resistor R20. Furthermore, although output voltage E2 of detecting circuit 52 is taken out as the output signal Eout, "E2−E1" may be taken out as the output signal as shown in FIG. 12.

Figure 12:
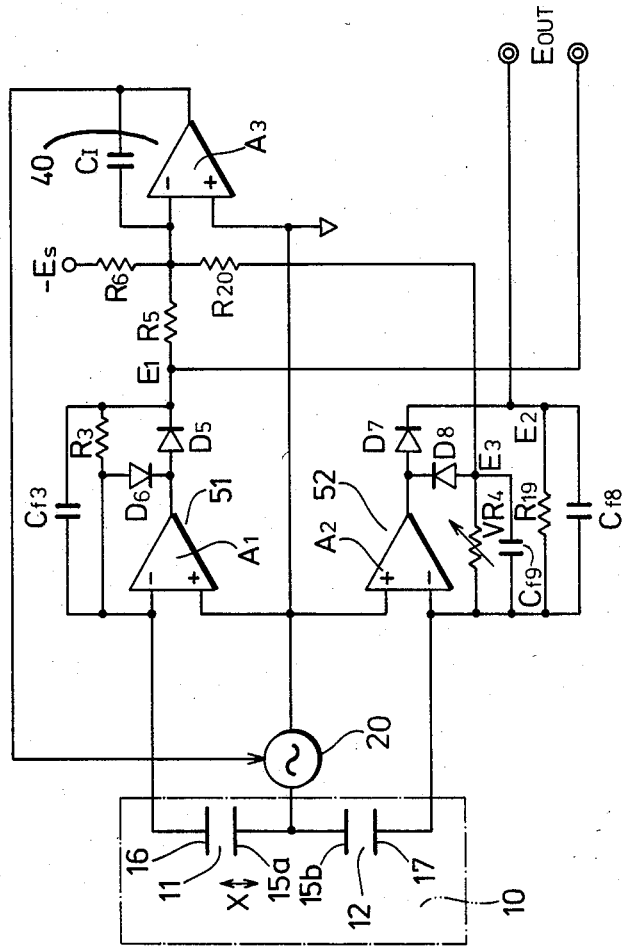

FIG. 12 is similar to FIG. 10 except that a terminal is provided at the interconnection of capacitor Cf3, resistor R3, diode D5 and resistor R5. In this embodiment, Eout becomes as follows:

$$Eout = [R5 \cdot R20 \cdot \{(R19 \cdot C2 - Cs3 \cdot R3 - R3 \cdot C0) \cdot d + (R19 \cdot C2 - Cs3 \cdot R3) \cdot X\} \cdot Es]/ \\ [R6 \cdot \{(R3 \cdot R20 \cdot C0 + R3 \cdot R20 \cdot Cs3 - VR4 \cdot R5 \cdot C2) \cdot d + (R3 \cdot R20 \cdot Cs3 - VR4 \cdot R5 \cdot C2) \cdot X\}] \quad 36$$

Then, when the following equation is satisfied:

$$R19 \cdot C2 - R3 \cdot Cs3 - R3 \cdot C0 = 0 \quad 37$$

the output signal Eout is given by $$Eout = \{R3 \cdot R5 \cdot R20 \cdot C0 \cdot (X/d) \cdot Es\}/\{R6 \cdot (R19 \cdot R20 - VR4 \cdot R5) \cdot C2\} \cdot [1 + \{1 - (C0 \cdot R3 \cdot R20)/C2 \cdot (R19 \cdot R20 - VR4 \cdot R5)\} \cdot (X/d)] \quad 38$$

Thus, it is possible to make Eout zero when the extent of displacement X is zero.

Figure 13:
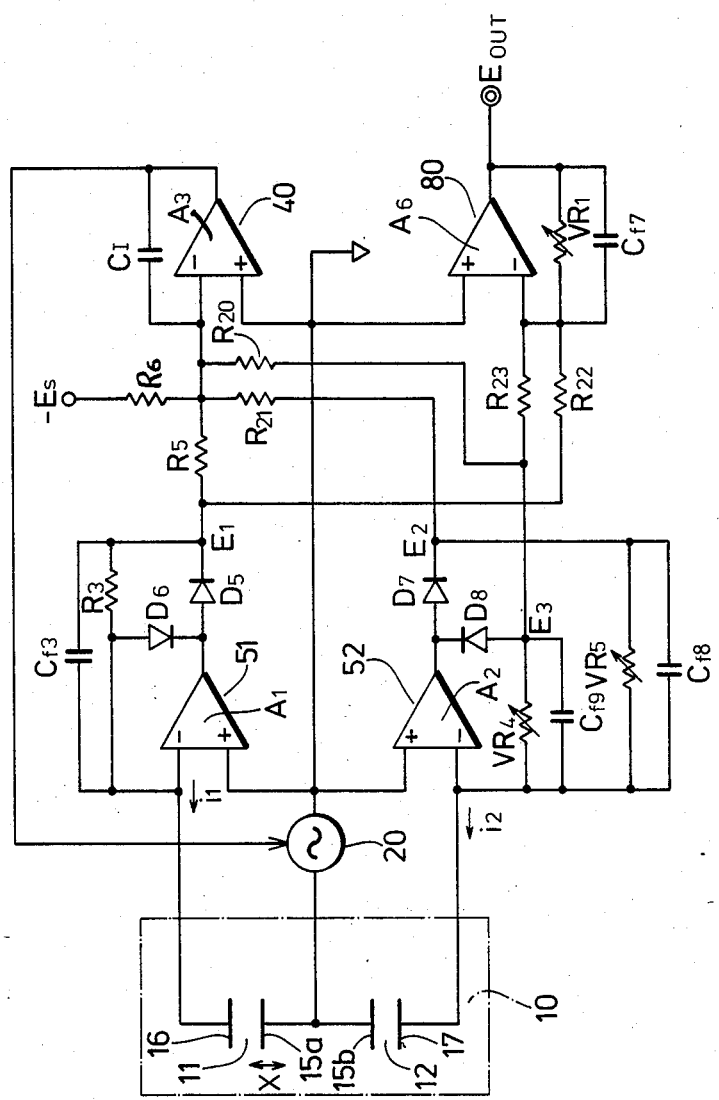

FIG. 13 is a circuit diagram of a seventh illustrative embodiment of the invention. This embodiment realizes, similarly to the embodiments of FIGS. 10 and 12, another system for correcting the non-linearity resulting from adverse influence due to stray capacitance Cs3 existing parallelly between movable electrode 15a and fixed electrode 16 and the non-linearity of the relation between a value to be measured and the extent of displacement of movable electrode 15a of variable condenser I1. In FIG. 13, elements which are similar to those of FIGS. 3, 4, 6, 10 and 12 bear the same reference numeral and for sake of simplicity, will not be described in further detail here.

Detecting circuit 52 comprises operational amplifier A2 and a feedback circuit for feeding the output of amplifier A2 back to the inverting input terminal (−) of amplifier A2. The feedback circuit comprises rectifying diodes D7 and D8, variable resistors VR4 and VR5, and smoothing condensers Cf8 and Cf9. The inverting input terminal (−) of amplifier A2 is connected to electrode 17 of reference condenser 12. The non-inverting input terminal (+) of amplifier A2 is connected to the reference point.

Detecting circuit 52 detects alternating current (produced in response to capacitance C2 of reference condenser 12) and provides positive DV voltage E2 at the connection point between diode D7 and variable resistor VR5, and negative DC voltage E3 at the connection point between diode D8 and variable resistor VR4.

Control circuit 40 comprises operational amplifier A3 having an inverting input (−) to which are connected capacitor CI, resistors R20, R21, R5, R6. Control circuit 40 having the amplifier A3 adds and integrates DC voltage E1 applied thereto through resistor R5, positive DC voltage E2 applied thereto through resistor R21, negative DC voltage E3 applied thereto through resistor R20, and negative reference voltage Es applied thereto through resistor R6; and controls oscillator 20 by means of the output of amplifier A3 applied via a connection therebetween.

The current/voltage converting circuit 80 converts the difference between a current (E1/R22) flowing through a resistor R22 due to positive DC voltage E1 applied to the inverting input terminal of amplifier A6 and current (E3/R23) flowing through resistor R23 due to negative DC voltage E3 also applied to the inverting input (−) of amplifier A6, into output voltage Eout.

In this embodiment of FIG. 13, the oscillation output of oscillator 20 is applied to variable condenser 11 and reference condenser 12. The DC voltages E1 and E3 obtained through detecting action of detecting circuits 51 and 52, are given by equations 27 and 29, respectively. E2 is given by the following equation:

$$E2 = f \cdot eB \cdot VR5 \cdot C2 \quad 39$$

Because the integrator of control circuit 40 controls the oscillation output of oscillator 20 so that the sum of positive direct current (E1/R5) due to positive voltage E1, positive direct current (E2/R21) due to positive DC voltage E2, negative direct current (E3/R20) due to negative DC voltage E3, and negative direct current (Es/R6) due to negative reference voltage Es becomes zero, the following equation holds:

$$\{(f \cdot eB \cdot R3 \cdot C1)/R5\} + \{(f \cdot eB \cdot VR5 \cdot C2)/R21\} - \{(-f \cdot eB \cdot VR4 \cdot C2)/R20\} = (Es/R6) = 0 \quad 40$$

On the other hand, output voltage Eout generated at the output end of current/voltage converting circuit 80 is given by:

$$Eout = (f \cdot eB \cdot VR1) \cdot \{(VR4/R23) \cdot C2 - (R3/R22) \cdot C1\} \quad 41$$

By combining 40 and 41, output voltage Eout becomes $$Eout = \{(VR4/R6) \cdot \{(VR4/R23) \cdot C2 - (R3/R22) \cdot C1\} ]/[(R3/R5) \cdot C1 + \}(VR5 \cdot R20 - VR4 \cdot R21)/(R21 \cdot R20)\} \cdot C2] \quad 42$$

Because capacitance C1 of variable condenser 11 is given by equation 32, by inserting this equation in the equation 42, and making R5−R20=R6 and R22=R23, the output voltage Eout becomes:

$$Eout = \{VR1 \cdot (VR4 \cdot C2 - R3 \cdot C0 - R3 \cdot Cs3) \cdot d + (VR4 \cdot C2 - R3 \cdot Cs3) \cdot X \cdot Es\}/R22 \cdot [\{R3 \cdot C0 + R3 \cdot Cs3 + C2 \cdot (VR5 \cdot R5 - VR4 \cdot R21)/R21\} \cdot d + \{R3 \cdot Cs3 + C2 \cdot (VR5 \cdot R5 - VR4 \cdot R21)/R21\} \cdot X] \quad 43$$

If the variable resistor VR4 is adjusted so that output voltage Eout becomes zero when the value to be measured is zero (i.e. when the extent of displacement X is zero) the following equation holds:

$$VR4 \cdot C2 = R3 \cdot C0 + R3 \cdot Cs3 \quad 44$$

and output voltage Eout is represented by:

$$Eout = K \cdot (d/X) \cdot [1/\{1 + (1-\alpha) \cdot (X/d)\}] \cdot Es \quad 45$$

wherein $K = (VR1 \cdot R3 \cdot R21 \cdot C0)/(VR5 \cdot R5 \cdot R22 \cdot C2)$ and $\alpha = (R3 \cdot R21 \cdot C0)/(VR5 \cdot R5 \cdot C2)$.

Accordingly, if the relation $\alpha=1$ is satisfied through adjustement of variable resistor VR5, output voltage Eout becomes:

$$Eout = K \cdot (X/d) \cdot Es \qquad 46$$

Figure 14:
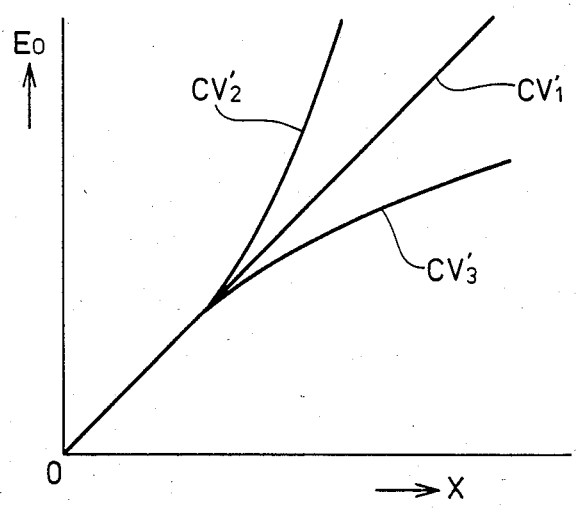

That is, as shown in FIG. 14, Eout corresponds exactly to the extent of displacement X as represented by line CV1'.

On the other hand, if the relation $\alpha=1$ is realized by adjusting variable resistor VR5, the rate of increase of the output voltage Eout increases with increase of the extent of displacement X, as shown by line CV2' in FIG. 14.

Moreover, if the relation $\alpha<1$ is realized, the rate of increase of Eout decreases with increase of the extent of displacement X, as shown by curve CV3' in FIG. 14.

Thus, it is possible to make the input/output relation non-linear. Accordingly, through adjustment of the value of the variable resistor VR5, adverse influence due to non-linearity of the relation between the value to be measured and the extent of displacement X of movable electrode 15a, and due to the non-linearity resulting from stray capacitance Cs3, can be compensated for by suitable adjustment of variable resistor VR5.

Compensation of non-linearity may also be carried out by making resistor VR5 fixed and resistor R21 variable and adjusting the resistor R21.

Figure 15:
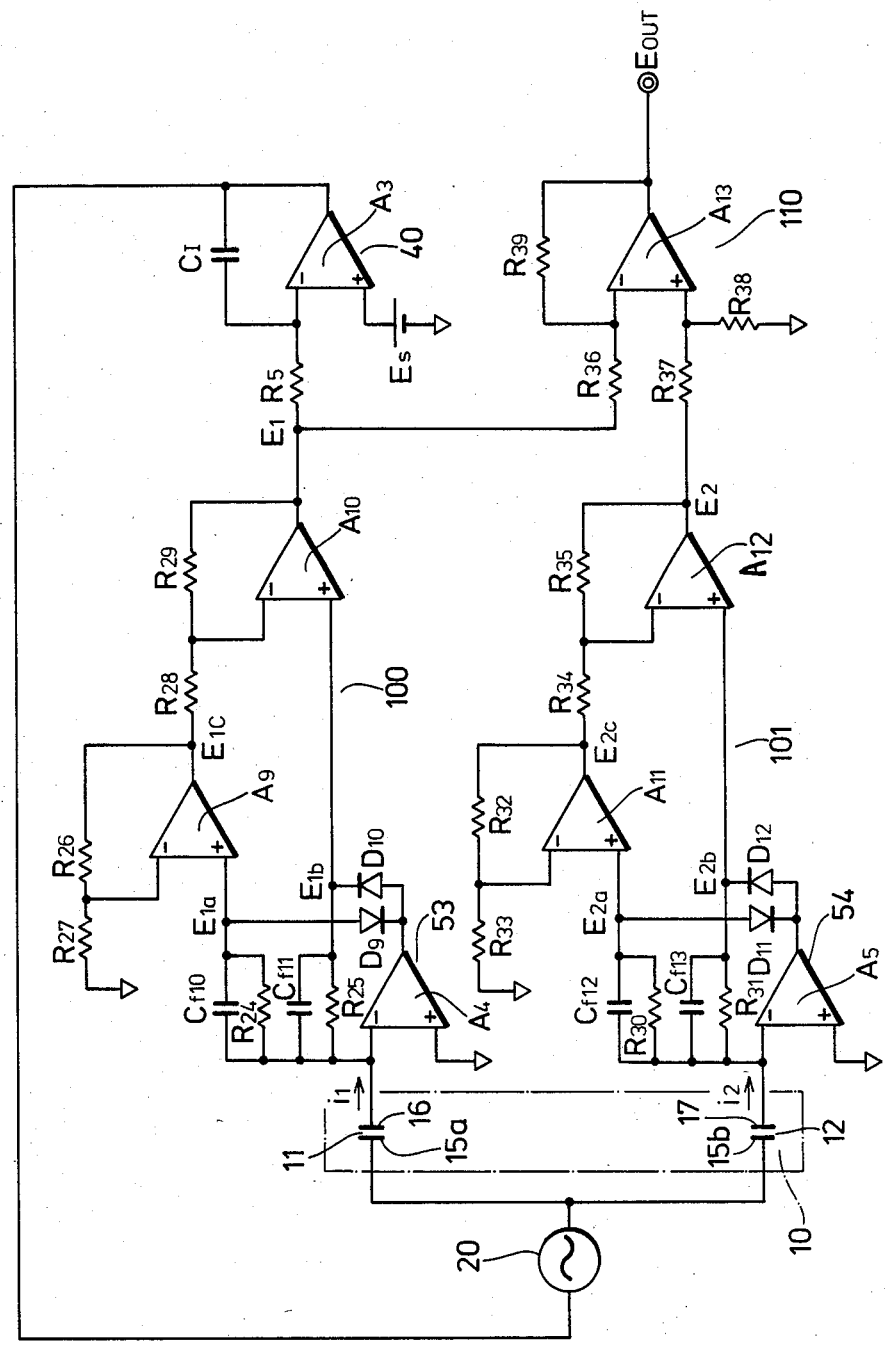

FIG. 15 is a circuit diagram of a eighth illustrative embodiment of the invention wherein a charge converter forming a rectifying circuit is designed so as to take out independently the positive and negative DC voltage corresponding to the capacitance and amplify the difference between these DC voltages in a high input impedance differential amplifier circuit, thereby to produce a DC output voltage, whereby a stable DC voltage can be obtained which does not depend upon an offset of the amplifier included in the charge converter. In FIG. 5, elements which are similar to those shown in FIGS. 7-9 bear the same reference numerals and for simplicity are not described hereat in detail.

Charge converter 53 comprises operational amplifier A4 and a feedback circuit. Between anode of diode D9 (which is used for rectifying the output of amplifier A4) and inverting input terminal (−) of amplifier A4, is connected a parallel circuit comprising a charging condenser Cf10 and resistor R24 (to output a negative DC voltage E1a corresponding to the capacitance C1 from the anode of diode D9). Between the cathode of diode D10 (which is used for rectifying the output of the amplifier A4) and inverting input terminal (−) of amplifier A4 is connected a parallel circuit comprising charging condenser Cf11 and resistor R25 (to output a positive DC voltage E1b corresponding to capacitance C1 from the cathode of diode D10).

A high input impedance differential amplifying circuit 100 comprises operational amplifiers A9 and A10 and is connected between charging circuit 53 and control circuit 40, as depicted. Negative DC voltage E1a is applied to the non-inverting input terminal (+) of amplifier A9. An output E1c of amplifier A9 is voltage divided by resistors R26 and R27 and fed back to inverting input terminal (−) of amplifier A9. Positive DC voltage E1b is applied to the non-inverting input terminal (+) of amplifier A10. The output E1c of amplifier A9 is applied through a resistor R28 to inverting input terminal (−) of amplifier A10. Output E1 of amplifier A10 is fed back through a resistor R29 to inverting input terminal (−) of amplifier A10. When the resistance value of resistors R26 through R29 are selected so that R26=R27 and R28=R29, the output of amplifier A10 (i.e. the output E1 of differential amplifier circuit 100) becomes:

$$E1 = 2 \cdot (E1b - E1a) \qquad 47$$

That is, this circuit amplifies the difference between E1a and E1b.

On the other hand, charge converter 54 comprises operational amplifier A5 and a feedback circuit. Between the anode of diode D11 (used for rectifying the output of amplifier A5) and inverting input terminal (−) of amplifier A5, is connected a parallel circuit comprising charging condenser Cf12 and resistor R30 (to output a negative DC voltage E2a corresponding to capacitance C2 from the anode of diode D11). Between the cathode of diode D12 (used for rectifying the output of the amplifier A5) and inverting input terminal (−) of amplifier A5 is connected a parallel circuit comprising charging condenser Cf13 and resistor R31 (to output a positive DC voltage R2b corresponding to the capacitance C2 from the cathode of diode D12).

A high input impedance differential amplifying circuit 101 is connected between charge converter 54 and subtractor 110, and comprises operational amplifiers A11 and A12. A negative DC voltage E2a is applied to the non-inverting input terminal (+) of amplifier A11. An output E2c of amplifier A11 is voltage divided by resistors R32 and R33 and fed back to the inverted input terminal (−) of amplifier A11. A positive DC voltage E2b is applied to the non-inverting input terminal (+) of amplifier A12. The output E2c of amplifier A11 is applied through a resistor R34 to inverting input terminal (−) of amplifier A12. The output E2 of amplifier A12 is fed back through a resistor R35 to the inverted input terminal (−) of amplifier A12. Similar to the high input impedance differential amplifing circuit 100, if the resistance values of resistors R32 through R35 are selected so that R32=R33 and R34=R35, the output E2 of differential amplifier circuit 101 becomes $$E2 = 2 \cdot (E2b - E2a) \qquad 48$$

That is to say, this circuit amplifies the difference between E2a and E2b.

Advantageously, the embodiment of FIG. 15 eliminates adverse influence due to offset voltage of amplifiers A4 and A5 included in charge converters 53 and 54 as explained below. Denoting the offset voltage of amplifier A4 by $\Delta Vos$, positive and negative DC voltages E1b and E1a of charge converter 100 are given by the following equations:

$$E1b = f \cdot eB \cdot C1 \cdot R25 + \Delta Vos \qquad 49$$

$$E1a = f \cdot eB \cdot C1 \cdot R24 + \Delta Vos \qquad 50$$

Thus, output E1 of the high input impedance differential amplifying circuit 100 for amplifying the difference between E1b and E1a becomes $$E1 = 2f \cdot eB \cdot C1 \cdot (R24 + R25) \qquad 51$$

That is to say, adverse influence due to offset voltage is eliminated by this embodiment.

In like manner, influence due to offset voltage of amplifier A5 of charge converter 54 is also eliminated by the embodiment.

Control circuit 40 comprising operational amplifier A3 connected at its output to oscillator 20, controls the oscillation output of oscillator 20 so that DC voltage E1 becomes identical to the DC reference voltage Es. Thus, the product of the frequency f and amplitude eB of the oscillation output is given by:

$$f \cdot eB = Es / \{2C1 \cdot (R24 + R25)\} \qquad 52$$

Outputs E1 and E2 of high input impedance difference amplifier circuits 100 and 101, respectively, are applied to a subtractor circuit 110, by which means the difference therebetween is computed. Subtractor 110 comprises an operational amplifier A13. E1 is applied to the inverting input terminal (−) of amplifier A13 through a resistor 36. Output voltage E2 from amplifier A12 is voltage divided by resistors R37 and R38 and is applied to the non-inverting input terminal (+) of amplifier A13. The output of amplifier A13 is fed back through a resistor R39 to inverting input terminal (−) of amplifier A13. Thus, by selecting the resistance value of resistors R24, R25, R30 and R31 so that R24=R25=R30=R31=R; and the resistance values of the resistors R36 through R39 so that R36=R37=R38=R39, the output Eout of subtractor 110 becomes:

$$Eout = 4f \cdot eB \cdot R \cdot (C2 - C1) \qquad 53$$

Figure 16:
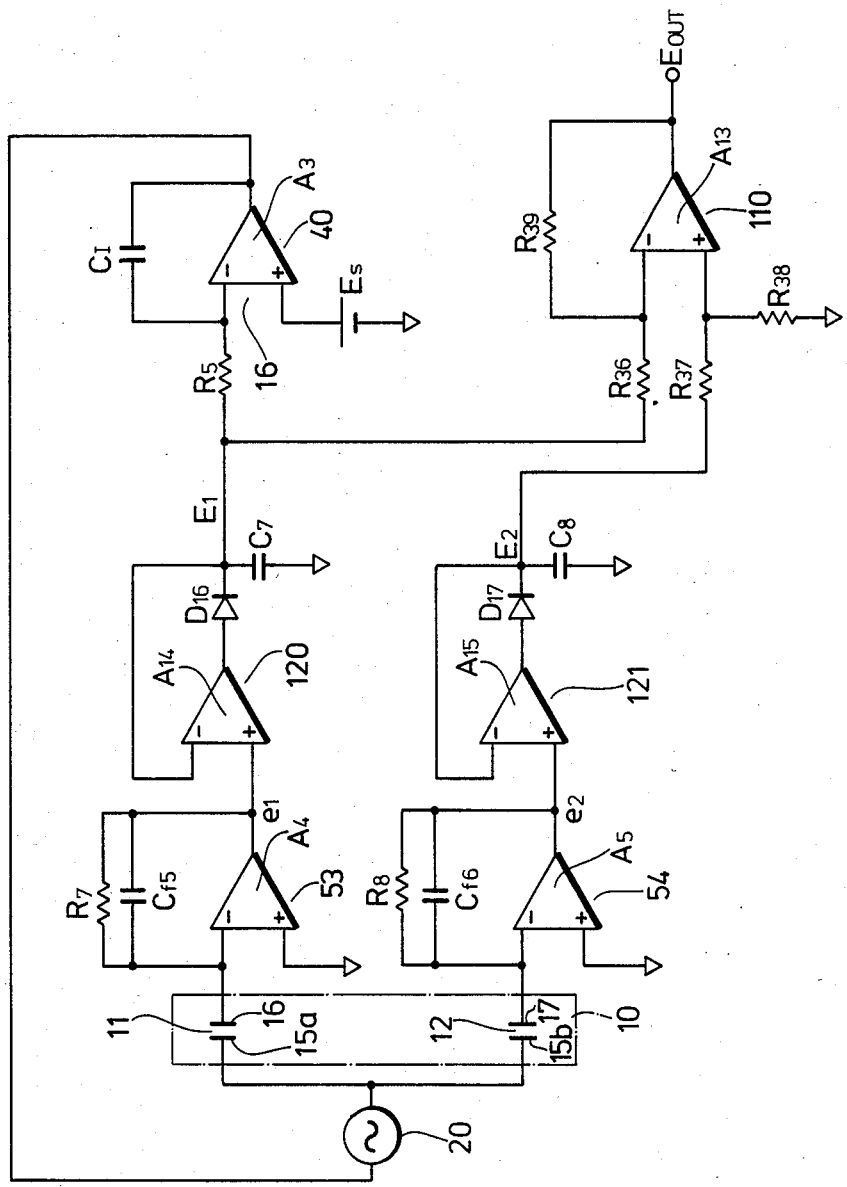

FIG. 16 is a circuit diagram of a ninth illustrative embodiment of the invention, wherein a rectifying circuit is formed by a charge converter for outputting an AC voltage corresponding to the capacitance and a peak detector, supplied with the output from the charge converter, which outputs a DC voltage relating to that capacitance. By such a system, the circuit configuration of the rectifying circuit is considerably simplified. In FIG. 16, elements which are similar to those shown in FIGS. 7-9 and 15 bear the same reference numbers and for simplicity will not be further described in detail hereat.

A first peak detector 120 is connected between charge converter 53 and control circuit 40, and comprises an operational amplifier A14, diode D16 and condenser C7. An AC output e1 of charge converter 53 is applied to the non-inverting input terminal (+) of amplifier A14.

A second peak detector 121 is connected between charge converter 54 and subtractor circuit 110, and comprises an operational amplifier A15, diode D17 and condenser C8. An AC output e2 of charge converter 54 is applied to the non-inverting input terminal (+) of amplifier A15.

In the FIG. 16 embodiment, if the time constants of the feedback circuits of the converters 53,54 are selected to be sufficiently large, in comparison to the oscillation period 1/f of oscillator 20, the peak-to-peak value E1pp (=C1·eB/Ca1) of output e1 of converter 53 corresponds to the capacitance C1 of variable condenser 11, and the peak-to-peak value E2pp (=C2·eB/Ca2) of output e2 of converter 54 corresponds to capacitance C2 of reference condenser 12. Output E1 of first peak detector 120, having detected the peak value of output e1 of converter 53, and output E2 of second peak detector 121, having detected the peak value of output e2 of converter 54, are given by:

$$E1 \approx (\tfrac{1}{2}) \cdot (C1/Ca1) \cdot eB \qquad 54$$

$$E2 \approx (\tfrac{1}{2}) \cdot (C2/Ca2) \cdot eB \qquad 55$$

Control circuit 40 controls the oscillation output of oscillator 20 so that output E1 of peak detector 120 becomes identical to reference voltage Es. Accordingly, the oscillation output eB of oscillator 20 is given by:

$$eB = 2 \cdot (Ca1/C1) \cdot Es \qquad 56$$

The output E1 of first peak detector 120 and output E2 of second peak detector 121, are applied to the subtractor circuit 110, which then computes the difference E2−E1, to thereby provide output voltage Eout.

The invention enjoys one or more of the following advantages and features. For example, adverse influences due to stray capacitances existing between fixed electrode 16 and a reference point and/or between movable electrode 15a and fixed electrode 16 of variable condenser 11, are easily eliminated by the invention. Moreover, adverse influences due to parallel capacitance and to forward voltage of the rectifying diodes, are eliminated in the invention, for example, by including in the rectifying circuit, a charge converter having compensation diodes connected in a feedback circuit thereof. Furthermore, advantageously, in the invention, adverse influence due to temperature effects on parts of the device (other than the rectifying diodes) is eliminated by a novel temperature compensation circuit. Also, the non-linearity of the relation between the value to be measured and the extent of displacement of movable electrode 15a of variable condenser 11, and the like, is readily and effectively compensated for by the invention. Influence due to offset of an amplifier included in the charge converter, is eliminated by the invention by taking out independently positive and negative DC voltages corresponding to the capacitance, and amplifying the difference between these voltages. Finally, the configuration of the device can be greatly simplified by forming a rectifying circuit using a charge converter and a peak detector.

The foregoing description is illustrative of the principles of the invention. Numerous modifications and extensions thereof would be apparent to the worker skilled in the art. All such modifications and extensions are to be considered to be within the spirit and scope of the invention.

What is claimed is:

1. A capacitive type converter device comprising
   variable condenser having a capacitance variable in response to a value to be measured;
   reference condenser having a capacitance fixed independent of said value to be measured;
   oscillator means for supplying an oscillation output to said variable condenser and to said reference condenser;
   first rectifying circuit comprising an operational amplifier having an inverting input terminal connected to said variable condenser, and having a non-inverting input terminal connected to a reference point, said first rectifying circuit producing an output;

second rectifying circuit for rectifying a current flowing through said reference condenser, said second rectifying circuit producing an output; and control means for controlling said oscillation output of said oscillation means in response to said output of said first rectifying circuit or in response to said output of said second rectifying circuit together with said output of said first rectifying circuit, whereby an output signal representative of the capacitance of said variable condenser is obtained from said second rectifying circuit, or an output signal representative of the difference between the capacitance of said reference condenser and the capacitance of said variable condenser is obtained from said outputs of said first and second rectifying circuits.

2. The device of claim 1, wherein said variable condenser comprises a movable electrode, a fixed electrode and a guard electrode, said movable electrode being displaced in response to said value to be measured, to vary the capacitance between said movable electrode and said fixed electrode; and wherein said reference condenser comprises a pair of fixed electrodes and a fixed capacitance therebetween; and wherein said guard electrode of said variable condenser is located on the same side as said fixed electrode and is connected to said reference point.

3. The device of claim 2, wherein said variable condenser, and said reference condenser are mounted on a unitary structure comprising an electrode having a portion serving as said movable electrode of said variable condenser and a portion serving as said fixed electrode of said reference condenser and connected to said reference point, a first circular electrode being another electrode of said variable condenser, a second circular electrode being another fixed electrode of said reference condenser, and a third circular electrode located between said first and second circular electrodes and being said guard electrode.

4. The device of claim 1, wherein said first rectifying circuit comprises an operational amplifier having an inverting input terminal connected to said variable condenser, a non-inverting input terminal connected to said reference point, and an output terminal; and a feedback circuit connecting said output terminal to said inverting input terminal, said feedback circuit comprising rectifying diodes and a smoothing circuit;

said second rectifying circuit comprises an operational amplifier having an inverting input terminal connected to said reference condenser, a non-inverting input terminal connected to said reference point, and an output terminal; and a feedback circuit connected between said output terminal and said inverting input terminal, said feedback circuit comprising rectifying diodes and as smoothing circuit; and wherein said control means controls oscillation output of said oscillator means to maintain unchanged said output of said first rectifying circuit.

5. The device of claim 1, wherein said first rectifying circuit comprises a first charge converter having an input circuit connected to said variable condenser for outputting an AC voltage of an amplitude representative of said capacitance of said variable condenser, and a feedback circuit; a first compensation diode circuit connected in said feedback circuit of said first charge converter; a first fixed condenser of a predetermined capacitance, means for applying an output of said first charge converter to said first fixed condenser; and a first rectifying means including diodes for rectifying an alternating current flowing through said first fixed condenser;

said second rectifying circuit comprises a second charge converter having input circuit connected to said reference condenser for outputting an AC voltage of an amplitude representative of said capacitance of said reference condenser, and a feedback circuit; a second compensation diode circuit connected to said feedback circuit of said second charge converter; a second fixed condenser of a predetermined capacitance; means for applying an output of said second charge converter to said second fixed condenser; and a second rectifying means including diodes for rectifying an alternating current flowing through said second fixed condenser;

said control means controlling said oscillation output of said oscillator means so that a current obtained through the rectifying action of said first rectifying circuit and representative of said capacitance of said variable condenser defines a given value, thereby to produce an output signal representative of the difference between a current obtained through the rectifying action of said second rectifying circuit and representative of said capacitance of said reference condenser, and a current obtained through the rectifying action of said first rectifying circuit and representative of said capacitance of said variable condenser.

6. The device of claim 1, wherein said control means controls said oscillator means to maintain unchanged a current corresponding to the difference between said capacitance of said variable condenser of said capacitance of said reference condenser.

7. The device of claim 1, wherein said control means controls said oscillator means to maintain unchanged the sum of a direct current representative of said capacitance of said variable condenser and positive and negative direct currents representative of said capacitance of said reference condenser, thereby to generate an output signal representative of a current corresponding to the difference between said capacitance of said reference condenser and said capacitance of said variable condenser.

8. The device of claim 1, wherein said first rectifying circuit comprises a first charge converter for rectifying and smoothing an alternating current flowing through said variable condenser and for generating a positive DC voltage and a negative DC voltage representative of said capacitance of said variable condenser, and a first high input impedance differential amplifying circuit for amplifying the difference between said positive DC voltage and said negative DC voltage of said first charge converter; and said second rectifying circuit comprises a second charge converter for rectifying and smoothing an alternating current flowing through said reference condenser, and for generating a positive DC voltage and a negative DC voltage representative of said capacitance of said reference condenser, and a second high input impedance differential amplifying circuit for amplifying the difference between said positive DC voltage and said negative DC voltage of said second charge converter.

9. The device of claim 1, wherein said first rectifying circuit comprises a first charge converter having an input circuit connected to said variable condenser for generating an AC voltage of an amplitude representative of said capacitance of said variable condenser, a first peak detector, and means for applying an output of said first charge converter to said first peak detector to cause said first peak detector to generate a DC voltage representative of said capacitance of said variable condenser; and said second rectifying circuit comprises a second charge converter having an input circuit connected to said reference condenser for generating an AC voltage of an amplitude representative of said capacitance of said reference condenser, a second peak detector, and means for applying an output of said second charge converter to said second peak detector to cause said second peak detector to generate a DC voltage representative of said capacitance of said reference condenser.

10. A capacitive type converter device comprising a variable condenser having a capacitance which varies in response to a force to be measured;

a reference condenser having a capacitance which is fixed independent of said force to be measured;

an oscillator for applying an oscillation output to said variable condenser and to said reference condenser;

a first rectifying circuit including rectifying diodes for detecting an alternating current flowing through said variable condenser in the form of a DC signal;

a second rectifying circuit including rectifying diodes for detecting an alternating current flowing through said reference condenser in the form of a DC signal;

a circuit for computing the difference between said outputs of said first rectifying circuit and said second rectifying circuit, and for providing an output representing said difference;

a temperature compensation circuit including a temperature sensor for generating a temperature compensation signal representative of the difference between an ambient temperature and a reference temperature; and control means for controlling said oscillation output of said oscillator to maintain unchanged the sum of said output of said first rectifying circuit and said output of said temperature compensation circuit.

* * * * *